(12) United States Patent
Sahiner

(10) Patent No.: US 9,994,438 B2
(45) Date of Patent: Jun. 12, 2018

(54) FILLING AUTOMATION SYSTEM

(71) Applicant: MEGA ENDÜSTRI KONTROL SISTEMLERI TICARET LIMITED SIRKETI, Ankara (TR)

(72) Inventor: Bülent Sahiner, Ankara (TR)

(73) Assignee: MEDA ENDUSTRI KONTROL SISTEMLERI TICARET LIMITED SIRKETI, Ankara (TR)

( * ) Notice: Subject to any disclaimer, the term of this patent is extended or adjusted under 35 U.S.C. 154(b) by 512 days.

(21) Appl. No.: 14/379,995

(22) PCT Filed: Feb. 21, 2013

(86) PCT No.: PCT/TR2013/000091
§ 371 (c)(1),
(2) Date: Aug. 20, 2014

(87) PCT Pub. No.: WO2013/126028
PCT Pub. Date: Aug. 29, 2013

(65) Prior Publication Data
US 2016/0016782 A1   Jan. 21, 2016

(30) Foreign Application Priority Data
Feb. 22, 2012  (TR) .................. 2012/01983

(51) Int. Cl.
| B67D 7/08 | (2010.01) |
| B60P 3/22 | (2006.01) |
| B67D 7/04 | (2010.01) |
| G05B 15/02 | (2006.01) |
| G06Q 10/08 | (2012.01) |
| B67D 7/14 | (2010.01) |

(52) U.S. Cl.
CPC ............... *B67D 7/08* (2013.01); *B60P 3/228* (2013.01); *B67D 7/04* (2013.01); *G05B 15/02* (2013.01); *G06Q 10/0838* (2013.01); *B67D 7/14* (2013.01)

(58) Field of Classification Search
CPC ............ B67D 7/08; B67D 7/36; G06Q 10/08
USPC .................................. 141/2, 4, 231
See application file for complete search history.

(56) References Cited

U.S. PATENT DOCUMENTS

| 4,266,580 A | 5/1981 | Dixon |
| 4,805,672 A | 2/1989 | Berrettini et al. |
| 6,681,815 B1 | 1/2004 | Westrich et al. |
| 2004/0085200 A1 | 5/2004 | McConnel et al. |
| 2006/0161374 A1* | 7/2006 | Hillam ................. B67D 7/3209 702/130 |
| 2008/0223874 A1 | 9/2008 | Carlins et al. |
| 2011/0120589 A1 | 5/2011 | Evans |

FOREIGN PATENT DOCUMENTS

| DE | 20 2009 003417 | 7/2010 |
| EP | 0 476 858 A1 | 3/1992 |
| EP | 0 697 370 A1 | 2/1996 |
| EP | 1 998 100 A | 12/2008 |
| GB | 2 416 756 A | 2/2006 |
| TR | 2010 00953 | 8/2011 |
| WO | WO 2010/102769 A1 | 9/2010 |

* cited by examiner

*Primary Examiner* — Timothy L Maust
*Assistant Examiner* — Timothy P Kelly
(74) *Attorney, Agent, or Firm* — Defillo & Associates, Inc; Evelyn Defillo

(57) ABSTRACT

An automated system for filling oil tankers and other equipment with different materials. The system comprises product/additive pumps, a section for delivering product/additive, and optionally an emergency control.

8 Claims, No Drawings

FILLING AUTOMATION SYSTEM

RELATED TECHNICAL FIELD

This invention is related to a filling automation system which will provide safe filling to oil tankers in refineries and filling terminals and provide correct and synchronized data records regarding the process from the order stage to the filling stage.

The invention can easily be adapted to many applications at refineries, e.g., fuel storage and filling terminals. For instance, applications such as filling of road oil tankers, injection of additives and markers, product transfer through pipelines, filling of train wagon, tanker and barge fillings at sea sales can be satisfactorily controlled by means of this invented system. The tankers which are filled from top and bottom in the oil tankers filling terminals/stations, white and black products, volumetric filling with meters, filling by weight via scales are easily supported.

CURRENT SITUATION OF THE TECHNIQUE

In prior applications, manual systems were used for the operations similar to tanker fillings in sea sales or train wagon fillings in product transfers through pipe lines or fillings of road tankers at refineries and filling terminals. A sequence of manual operations such as meter reading by the personnel in critical steps such as entry of filling data during filling or emptying operations or reading tare weight were used and in such a case this has caused many mistakes.

In regard to the systems applied in order to be able to make serial and fast filling, entry of the tare weight data read in the electronic scales manually by the filling personnel causes the system be slowed down and decreases the efficiency thereof.

With advancement of the technology, computer technologies which are used in many sectors of our day have also taken place in the production/manufacturing sector, and this provides benefit to the industrialists, especially in the major fields such as planning, manufacturing and shipping, etc. Progress has been made in production technologies through using the use of computer aided software, and so the industrial companies dealing with filling and distribution have started to implement the principle of getting maximum quality with minimum cost by decreasing all the unnecessary operations during the production stage even by minimizing all the troubles in the process.

When we looked at the current situation of the technique, it is seen that the patent document of No: TR2007 03661 relates to an automation system which is able to read an "LPG cylinder information card" automatically labeled over the LPG cylinder, making the fillings of these cylinders automatically and removing the faulty or misproduced cylinders from the conveyor line automatically.

In a prior technique, another patent related to the filling systems of No TR2010 00953 is related to tanker monitoring system which is able to make pricing peculiar to customers. This system is a controlling and monitoring equipment which receives the filling and emptying data taken from meters of the tankers used in any kind of liquid transportation in highways through a serial communication interface and processes such data and transfers the data to a central server over a GSM Modem.

Both of the above mentioned patents deal with innovations and automation subjects made for specific areas of the fillings of tankers or cylinders. No automation system is available presently which covers the process completely and provides correct and synchronized data entry of the operations from the order stage to filling. This invented filling automation system satisfies the needs in such sense, and provides monitoring of all the processes safely starting from entrance of the tanker to the gate until exit from the gate.

PURPOSE OF THE INVENTION

The purpose of this invention is to increase safety of fillings at filling terminals, prevent filling of the wrong product, keep the records of filling operations at computer media, and synchronize order and filling data by ensuring integration via ERP systems (such as SAP, LOGO, etc.).

Another purpose of this invention is to ensure keeping of the data to be recorded at filling operation, in another words, ensure data reliability.

Another purpose of the invention is to offer to the user an easy utilization facility.

Another purpose of the invention is to minimize project and operation costs.

EXPLANATION OF THE INVENTION

The invention is a filling automation system which comprises (1) a section where the filling orders are accepted; (2) product/additives pumps; (3) a section where product and additive pumping automation is carried out and emergency halting is provided when necessary; (4) a tanker filling section where tanker filling is carried out; (5) a pipe line filling section as well as alternative ship filling and wagon filling sections; (6) a tank area where movements of tanks are monitored; (7) a scale section where the weight of the product to be filled to the tanker is measured; (8) a pipe line monitoring section in order to monitor a pipe line where the product flows; (9) and a control room having a main server and a backup server where daily meter activities[and sales on tanker, customer, agent basis are monitored, retroactive reports are taken, day start and day end operations of all the fillings are monitored, and remote access is provided.

A main computer (server) located in the control room used in this invented automation system is in an active state and a second computer is in a passive state. The records processed by the automation will be stored in the backup computer first and then a database of the main computer next and both of them will accommodate the same data. Storage action will be made by using relational database properties. Thus, data security will be secured at a maximum level. Filling islands and tankers being filled are shown in the screen of the system graphically and in detail and which island, meter, or delivery order has a problem are warned graphically and in color. The data is stored in a Hard Disk Drive in case of power cut or due to another reasons.

Process steps of this invented tank filling automation system are as follows:

a. Order:

Order details are entered via an order module.

The respective driver of incoming orders which are communicated with ERP-DOS and similar communication programs are called for filling via an announce module. Relevant drivers are directed to a filling island.

A driver (or operator) enters the PIN number written over the Product Request Bill from the meter display. (That is he or she makes his card be read at the card reading system.)

Controls the meter PIN number via the system and takes the concerned information regarding the request.

Asks for a Tanker PIN code if necessary according to order type.

Asks for a Driver PIN code if necessary according to order type.

Asks for a compartment number.

Sets the product quantity regarding that COMPARTMENT automatically.

Filling is started by pressing the Start button.

Filling is continued by entering COMPARTMENT numbers again for other product requests given in the delivery note. If the filling operation of the compartment is whatsoever finished by pressing the PRINT button, the PIN number is asked for again for other COMPARTMENTS.

If only one type product is going to be taken to the tanker, only a COMPARTMENT number is asked for the 2nd and 3rd compartments.

After all of the products written in the Product Request Bill are delivered, the filling computer compares the starting and ending total quantities with a given product quantity and in case of error, locks the meter for intervention by responsible filling personnel.

Filling islands and tankers being filled are shown in the screen of the system graphically and in detail, and which island, meter or delivery order has a problem are warned graphically and in color.

The authority to intervene to the problems are within the scope of the authorities and filling is finalized through the computer screen by halting the filling when required.

When meter communication is cut due to a failure, the values already stored in the memory of the meter are read and, related tables are updated.

In case the program is shut down due to power cuts or other reasons, data is stored in a HDD.

Upon completion of the order without any mistake, a tanker graphic comes to its normal position on the meter screen.

The data of a realized filling are transferred to concerned units on a product and compartment basis.

A Product Delivery Receipt is given to the tanker driver for informative purposes while the tanker is left.

The order is locked if any trouble is occurred in the execution of work flow in the filling terminal. A user response is asked for.

b. Start Of Day:

Density values of the product entered from the order module are read by a Terminal Filling Automation System (TFAS) and loaded into the concerned meters automatically or from the program manually. The filling is not started without verifying density values. (These can be performed within day time on the condition that all the related meters are to be in stand-by mode.

Before the filling is started, modes of all the meters (alarm, failure, etc) are controlled by the system, and the meter cannot be used for filling without remedying the failures.

If desired, opening report of the meters are taken in at the start of the day. Filling is allowed after meter totalizer (a counter which is included in the meters and measures the data of how much product has flowed) values are recorded.

On request, meter totalizer values can be taken automatically during certain times determined by the system.

If there is a difference between the end of day totalizer value and the start of day meter totalizer value opened within day time/start of day which are recorded by the automation, then the meter is locked and filling cannot be started. The meter is opened for sales by giving approval from filling automation program.

c. Filling Operations

A driver (or operator) makes entry by entering the Barcode (PIN) number written on the Product Request Bill to the display of the control equipment by pressing the SET button in the electronic control equipment.

In the electronic card filling systems, (CARD ID) card based for order details are being read by the card reader and then filling is started.

In the compartment fillings, electronic control equipment controls the PIN number from the system and takes the data related to the order and asks for the COMPARTMENT number.

The system reads the capacity of the selected tanker's compartment and product details proportional to the capacity of compartment quantity comes to the screen. If it is desired, more lesser than the compartment capacity can be written. However, it does not permit to set more products bigger than the capacity of the compartment. The filling is started by pressing the Start button.

For other product requests in the delivery note, PIN and COMPARTMENT number are re-entered and filling is continued. If the filling of the compartment is ended by pressing the PRINT button for any reason the PIN number is asked for other compartments.

If the tanker will be filled fully with only a single product, only COMPARTMENT number is asked for other compartments.

After all the products written in the delivery note are delivered, the filling computer compares the starting and ending totalizer values with the given product quantity and flow to fulfill the order is stopped in case such values are contravened (does not give exit permission) and intervention of responsible filling personnel is waited.

d. During Filling:

Filling details and of the islands and tankers being filled are shown in the screen of the system graphically and which island, meter, or delivery note have a problem are warned graphically and in message. Filling logs are recorded.

In case of the problems to be experienced during filling, responsible filling personnel stops the filling when necessary and ends it manually using the PC.

When the electronic control equipment communication is cut due to failure, the values in the memory of the electronic control equipment are read and entered into the PC manually.

e. After Filling:

Upon completion of the filling, its entry is deleted from the TFAS screen automatically.

Product Delivery Receipt is given to the tanker driver for informative purposes while the tanker is left.

The Terminal Filling Automation Program (TFAP) receives Barcode (PIN) No, Plate Number of Tanker, Compartment Capacities, Product Details (product with and without additives), total Product Quantity from the FlashTech order module.

When the filling operation is completed, realized filling information is entered into the system. Filling quantities are transferred to order module for invoicing.

f. End of Day:

After the filling operations are completed; the following reports are prepared;

Total sales on a meter basis;

Total sales on a product basis;

Total sales on a total tankers' number basis;

Total sales on a customer/provider basis; and a settlement for tank, filling, and selling (invoice) is done.

This invention enables monitoring of tanker filling operations in an automation environment starting from order stage until exit stage. Throughout the process, a tanker's status can be determined by means of asking to the system about the status of any tanker at any time (during order, filling stage, etc).

The risk of giving the product from the wrong meter or filling line is zeroized.

Electronic and mechanical failure information which may arise in filling equipment such as meter, control valve, and temperature gauge can be taken from the Electronic control equipment and so it is possible to make an immediate response to failure.

Filling operation is done on a tanker's compartment basis. Compartment capacities pre-defined on the system are reflected on the meter automatically during filling operations. Potential product overflow/overspill is provided by a loading quantity as much as a desired compartment quantity.

Fillings which are halted due to power cut or as a result of any other reason continue after such conditions that caused such halting are finished and no information/data loss is occurred.

In the case that filling automation is whatsoever interrupted, the filling can be made manually and after the conditions return to normal, filling details stored in the memory of the meter can be transferred to the system.

Tank/product stock calculation is kept and reported properly.

Product inputs and outputs can be monitored as tank movements and volume and quantity of the product contained in the tank are calculated in accordance with API tables by means of tank calibration tables.

In the case that more than one company make fillings by using the storage facilities of a same terminal commonly, stock monitoring on product owner company basis can easily be made. With this feature, joint ventures can easily use the filling terminals.

System input of tank measurement values are made directly and automatically with the automatic tank measurement system connection through manually or automatically.

All the filling details and technical properties as well as general details are stored in system memory. If required, it is possible to access previous filling data.

By putting the system into service, it is contributed to manpower and human health and environmental matters by minimizing the filling time to a minimum level.

Filling operations and the details in the filling terminals at various locations of the company can be spontaneously monitored in the automation system from the principal office of the company.

The invention claimed is:

1. An automation method, comprising the following steps:
   entering order details via an order module of a Terminal Filling Automation System (TFAS);
   calling a driver of an incoming order which is communicated with ERP-DOS (a communication program) for filling via an announce module of the TFAS and directing the driver to a filling island;
   receiving from a driver (or operator) a PIN number written over a Product Request Bill on a display of a meter or control equipment when a SET button is pressed;
   reading the driver's card by a card reading system;
   controlling the PIN number via the TFAS and taking concerned information regarding the order details;
   requesting a Tanker PIN code according to an order type when the Tanker PIN code is unknown;
   requesting a Driver PIN code according to an order type when the Driver PIN code is unknown;
   requesting a compartment number;
   setting a product quantity regarding a compartment corresponding to the compartment number automatically;
   starting a filling when a Start button is pressed;
   continuing the filling when a second compartment number is entered in the TFAS for another product request given in a delivery note;
   if the filling of the compartment is finished by pressing a PRINT button, requesting a new PIN number for a next compartment;
   if only a single product is going to be taken to a tanker, requesting only a new compartment number for the next compartments;
   delivering all products written in the Product Request Bill;
   locking the meter and preventing the filling from starting if there is an erroneous difference between a first meter totalizer value at a first predetermined time and a second meter totalizer value at a second predetermined time, to await an intervention by a user, wherein the first and second predetermined times are automatically recorded;
   showing on a computer screen of the TFAS graphically the filling island and the tanker being filled a warning of the island, the meter, or the order with a problem graphically and in color;
   finalizing the filling through the computer screen by halting the filling when the filling is compete;
   reading, when meter communication with the meter or the electronic control equipment is cut due to a failure, values already stored in a memory of the meter or the electronic control equipment, updating related tables, and entering the values into a PC (personal computer);
   storing meter values and data in a hard disk drive in case a Terminal Filling Automation Program (TFAP) is shut down;
   showing, upon completion of the order without any error, a tanker graphic in its normal status on a screen of the meter;
   transferring data of a completed filling to concerned units on a product and compartment basis;
   providing a Product Delivery Receipt to the driver;
   locking the order if any error occurs in a filling terminal, and requesting a user response;
   reading, by the TFAS, density values of the product entered from the order module and loading the density values into concerned meters automatically or manually from the TFAP;
   verifying the density values in daytime when all the concerned meters are in stand-by mode before the filling begins;
   controlling modes of all meters and remedying any errors with the meters before the filling begins;
   taking an opening report of the concerned meters, recording meter totalizer values, and then allowing the filling;
   automatically taking the meter totalizer values upon a user request during predetermined times determined by the TFAS;
   opening the meter for sales by giving approval via the TFAP;
   reading a capacity of a compartment of a selected tanker and displaying product details proportional to the capacity of the compartment of the selected tanker on the computer screen;
   using all or part of the capacity of the compartment the selected tanker;
   recording filling logs;

enabling a user to manually end the filling by using a (PC) personal computer;

upon completion of the filling, deleting an entry of the filling from the computer screen of the TFAS automatically;

receiving, by the TFAP, the PIN number, a plate number of tanker Plate Number of Tanker, compartment capacities, the product details, and total product quantity;

when the filling is complete, entering filling information on a compartment basis into the TFAS; and transferring filling quantities to the order module for invoicing.

2. A method of safe and efficient filling of oil tankers by utilizing a Terminal Filling Automation System (TFAS), comprising the steps of:

accepting an incoming filling order and storing order details;

directing a driver of a respective incoming order to a respective filling island;

receiving related information regarding the filling order, and controlling to enable start of the filling;

by a filling computer having a program, comparing, after all products written in a Product Request Bill are delivered, starting and ending total quantities with a given product quantity, and in case of error locking a corresponding meter;

showing filling islands and tankers being filled on a computer screen graphically and warning of an island, meter, or delivery order with a problem graphically and in color;

completing filling through the computer screen by halting the filling when required;

reading, when meter communication is cut due to a failure, values already stored in a memory of the meter and updating related tables;

storing data in a hard disk drive in case the program is shut down;

showing, upon completion of the order without any mistake, a tanker graphic in its normal position on a meter screen;

transferring data of a completed filling to concerned units on a product and compartment basis;

locking the order if any trouble occurs in the execution of work flow in a filling terminal, and requesting a user response; and by the Terminal Filling Automation System (TFAS), reading density values of the product entered from an order module and loading the density values into concerned meters automatically or from the program manually;

wherein the filling is not started without verifying density values, which is performed in daytime on the condition that all related meters are to be in standby mode.

3. The method as in claim 2, wherein before the filling is started, failures are remedied, filling is allowed after meter totalizer values are recorded, a meter totalizer being a counter which is included in the meters and measures the data of how much product has flowed, on request, the meter totalizer values can be taken automatically during certain times determined, if there is a difference between an end of day meter totalizer value and a start of day meter totalizer value recorded by the Terminal Filling Automation System, the corresponding meter is locked and filling cannot be started, and the meter is opened for sales after receiving approval from the program.

4. The method of claim 3, wherein after all of the products written in a delivery note are delivered, the filling computer compares the start of day and end of day totalizer values with the given product quantity, stops the order if such values are contravened, and awaits intervention of responsible filling personnel, filling details of the filling islands and tankers being filled are shown on the computer screen of the system graphically and any island, meter, or delivery note with a problem is warned graphically and in a message, filling logs are recorded, in case of a problem experienced during filling, the responsible filling personnel stops the filling when necessary and ends the filling manually using a PC, when the electronic control equipment communication is cut due to failure, the values in a memory of the electronic control equipment are read and entered into the PC manually, upon completion of the filling, its entry is deleted from a screen of the Terminal Filling Automation System automatically, when the filling operation is complete, filling information on a compartment basis is entered, and filling quantities are transferred to the order module for invoicing.

5. A method of utilizing an automation system that provides synchronized data entry, monitoring, and control of operations, comprising the steps of:

an accepting step of accepting an incoming filling order;
a directing step of directing drivers to filling islands;
a controlling step of controlling to enable start of filling and emergency stopping when necessary;
a displaying step of:
monitoring and displaying movements of tanks,
monitoring filling islands and tankers being filled, and
warning graphically of any filling island, meter, or delivery order having a problem;
a backup step of storing processed records in a backup server in a passive state;
a main server step of a main server in an active state, including:
monitoring and storing daily meter activities as well as sales on a tanker, customer, and agent basis,
taking retroactive reports,
monitoring day start and day end operations of each filling,
storing the processed records that were first stored in the backup server,
storing meter values in a hard disk drive,
reading density values of the product entered in said accepting step and updating tables with the density values and loading the density values into concerned meters, and verifying the density values before the filling is started,
comparing starting and ending total quantities with a given product quantity, and in case of error locking a corresponding meter, and
reading, when meter communication is cut due to a failure, values already stored in a memory of the meter and updating related tables.

6. The method as in claim 5, further comprising a pipeline monitoring step of monitoring a pipeline where the product flows.

7. The method as in claim 5, wherein
before the filling is started, failures are remedied,
filling is allowed after meter totalizer values are recorded, a meter totalizer being a counter which is included in the meters and measures the data of how much product has flowed,
on request, the meter totalizer values can be taken automatically during certain determined times,
if there is a difference between an end of day meter totalizer value and a start of day meter totalizer value, the corresponding meter is locked and filling cannot be started, and
the meter is opened for sales after receiving approval from the program.

8. The method of claim 7,
wherein
after all of the products written in a delivery note are delivered, the filling computer compares the start of day and end of day totalizer values with the given product quantity, stops the order if such values are contravened, and awaits intervention of responsible filling personnel,
filling details of the filling islands and tankers being filled are shown on the computer screen of the system graphically and any island, meter, or delivery note with a problem is warned graphically and in a message,
filling logs are recorded,
in case of a problem experienced during filling, the responsible filling personnel stops the filling when necessary and ends the filling manually using a PC,
when the electronic control equipment communication is cut due to failure, the values in a memory of the electronic control equipment are read and entered into the PC manually, upon completion of the filling, its entry is deleted from display automatically, when filling is complete, filling information on a compartment basis is entered, and filling quantities are transferred for invoicing.

* * * * *

UNITED STATES PATENT AND TRADEMARK OFFICE
CERTIFICATE OF CORRECTION

PATENT NO. : 9,994,438 B2  
APPLICATION NO. : 14/379995  
DATED : June 12, 2018  
INVENTOR(S) : Bülent Sahiner Page 1 of 1

It is certified that error appears in the above-identified patent and that said Letters Patent is hereby corrected as shown below:

On the Title Page

Item (73), should read:  
(73) Assignee: MEGA ENDUSTRI KONTROL SISTEMLERI TICARET LIMITED SIRKETI Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*